Feb. 23, 1965  E. UMBRICHT  3,170,333
ROTARY-POSITIONING DEVICE
Filed March 29, 1963  6 Sheets-Sheet 1

INVENTOR.
EMIL UMBRICHT
BY
Curtis, Morris and Safford
ATTORNEYS

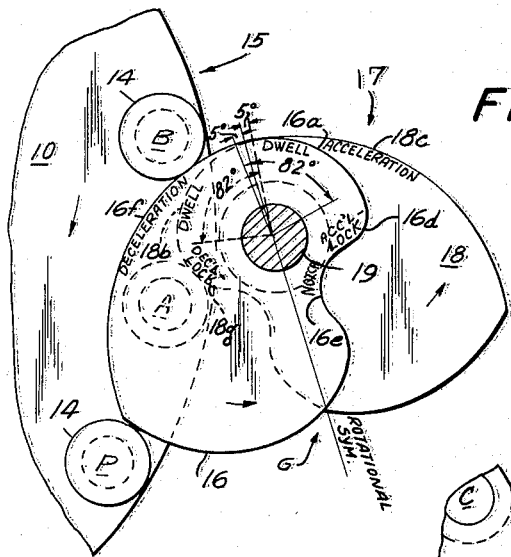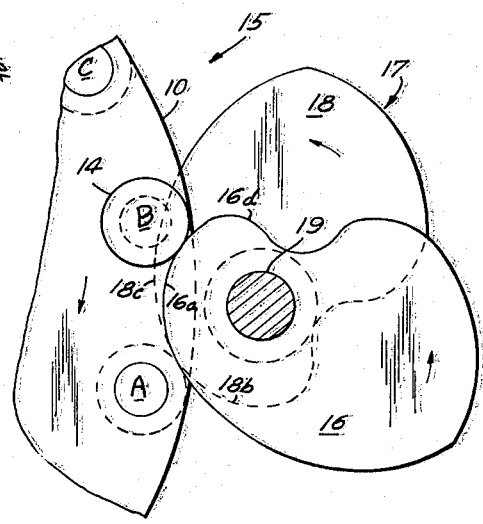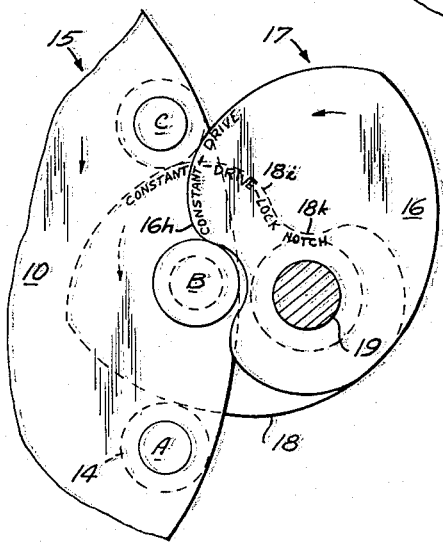

Feb. 23, 1965  E. UMBRICHT  3,170,333
ROTARY-POSITIONING DEVICE
Filed March 29, 1963  6 Sheets-Sheet 3

INVENTOR.
EMIL UMBRICHT
BY
Curtis, Morris and Safford
ATTORNEYS

Feb. 23, 1965  E. UMBRICHT  3,170,333
ROTARY-POSITIONING DEVICE
Filed March 29, 1963  6 Sheets-Sheet 4

INVENTOR.
EMIL UMBRICHT
BY
Curtis, Morris and Safford
ATTORNEYS

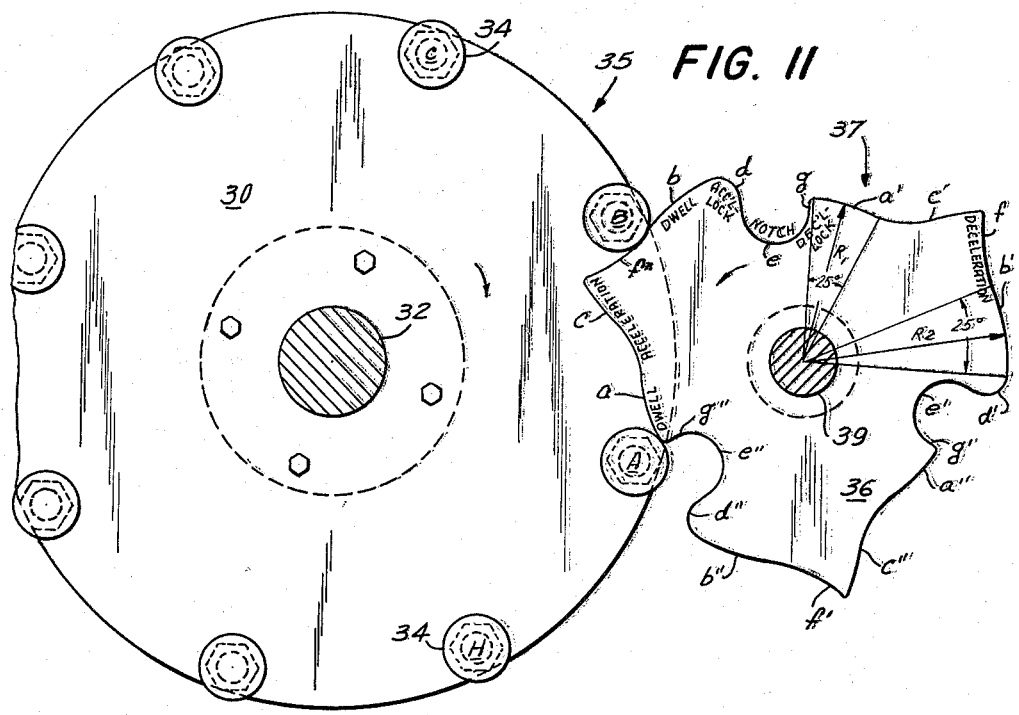
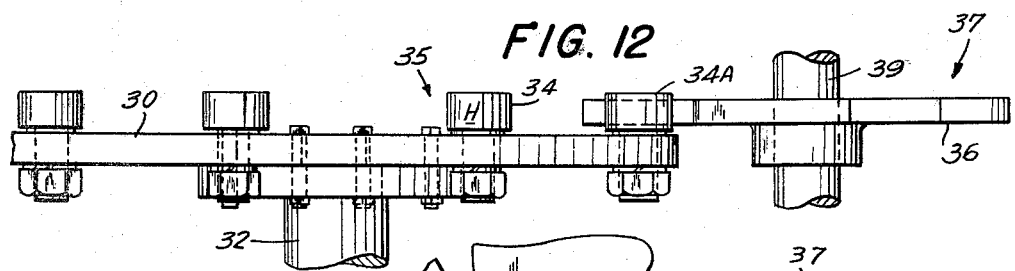
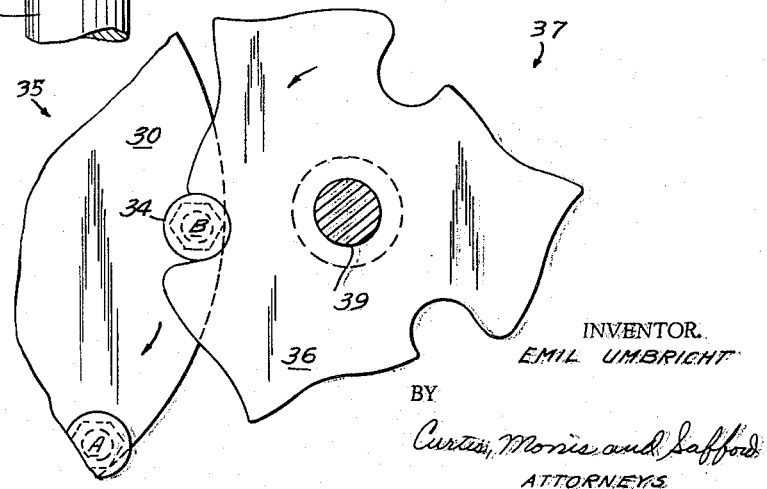

Feb. 23, 1965    E. UMBRICHT    3,170,333
ROTARY-POSITIONING DEVICE
Filed March 29, 1963    6 Sheets-Sheet 6

INVENTOR.
EMIL UMBRICHT
BY
Curtis, Morris and Safford
ATTORNEYS

United States Patent Office 3,170,333
Patented Feb. 23, 1965

3,170,333
ROTARY-POSITIONING DEVICE
Emil Umbricht, Northville, Mich., assignor to Ajem Laboratories, Inc., Livonia, Mich.
Filed Mar. 29, 1963, Ser. No. 268,870
2 Claims. (Cl. 74—84)

The present invention relates to "gear" devices for smooth intermittent rotary power transmission and to devices for use in machines which index articles, such as, for example, heavy castings and other parts to be machined, cleaned, surface treated, etc.

In one type of industrial operation it is necessary to provide for powered liquid cleaning, deburring and/or other surface treatment of articles. These treatments often involve successive steps carried out at different positions and require such parts to be moved step-by-step at one or more positions, with or without predetermined delay periods for treatment before being moved on. In several prior patents and patent applications by co-workers and myself, we have disclosed highly effective devices for indexing parts through successive work stations with stops for power washing and/or grit blasting, deburring, etc. For example, Patent No. 2,979,062, discloses a power driven stepping mechanism adapted for operation by hydraulic pistons and the like, and its use to index parts in a power washer. In the application, Serial No. 122,521, filed July 7, 1961, now issued as Patent No. 3,146,550, on September 1, 1964, we disclosed another hydraulic indexing system in a rotary abrasive deburring machine. Finally, in the application, Serial No. 122,338, filed May 24, 1961, now issued as Patent No. 3,094,207, on June 18, 1963, we disclosed a rotary indexing device employing an electric drive with an eccentric arm assembly.

The present invention has now provided a more effective and desirable, simple rotary electric motor drive, positive step-by-step indexing device to replace the known hydraulic and other earlier systems.

It is both an object and an advantage of the present invention to provide an indexing device with rapid motion, smooth but variable acceleration and deceleration, and positive control of the positioning throughout both the actual indexing and the dwell periods, and further to provide with these, the advantages of a simple, compact, rugged, and advantageously electrically driven, indexing mechanism comprising only a few component parts and having only comparatively small power requirements.

A further advantage of this invention is the ability to provide an indexing device with sufficiently large dwell angles to permit the drive motor to be shut off, or otherwise disconnected from the remainder of the device, thereby to extend the effective dwell periods without undue loading of the motor before operational speed is attained.

An additional object is to provide an efficient rotary drive gear device which can be adapted to give a variety of predetermined intermittent power transmissions from a given rotary power source.

The present invention includes in its scope a cam drive engaging a modified driven "pin wheel"; which by cooperatively varying the construction of each, as disclosed below, results in the desired indexing motion.

Further aspects, features, objects, and advantages of the present invention will be more fully understood from the following description considered in conjunction with the accompanying drawings showing a present preferred embodiment illustrative of the invention. Although I shall point out herein certain modifications and alternatives in the preferred embodiment, it should be understood that these are given for purposes of illustration, in order that others skilled in this art may fully understand the invention and be enabled thereby to modify and adapt it as may be best suited for conditions of various practical uses.

In the drawings:

FIGURE 3 is a slightly enlarged plan view of a portion of the same with the dwell angle for each cam plate indicated;

FIGURE 4 is a view similar to FIGURE 3 after a rotation of 90° from FIGURE 3;

FIGURE 5 is view similar to FIGURE 3 after a rotation of 180° from FIGURE 3 and 90° before the position shown in FIGURE 1;

FIGURE 11 is a plan view similar to FIGURE 1, but of a third embodiment, an eight station, single cam indexing mechanism embodying the present invention, with one set of dwell angles having radii ($R_1$ and $R_2$) for the cam being indicated;

FIGURE 12 is a view of this third embodiment in side elevation;

FIGURE 13 is a plan view of a portion of this third embodiment after about an 80° counterclockwise rotation from FIGURE 11;

Figure 1:
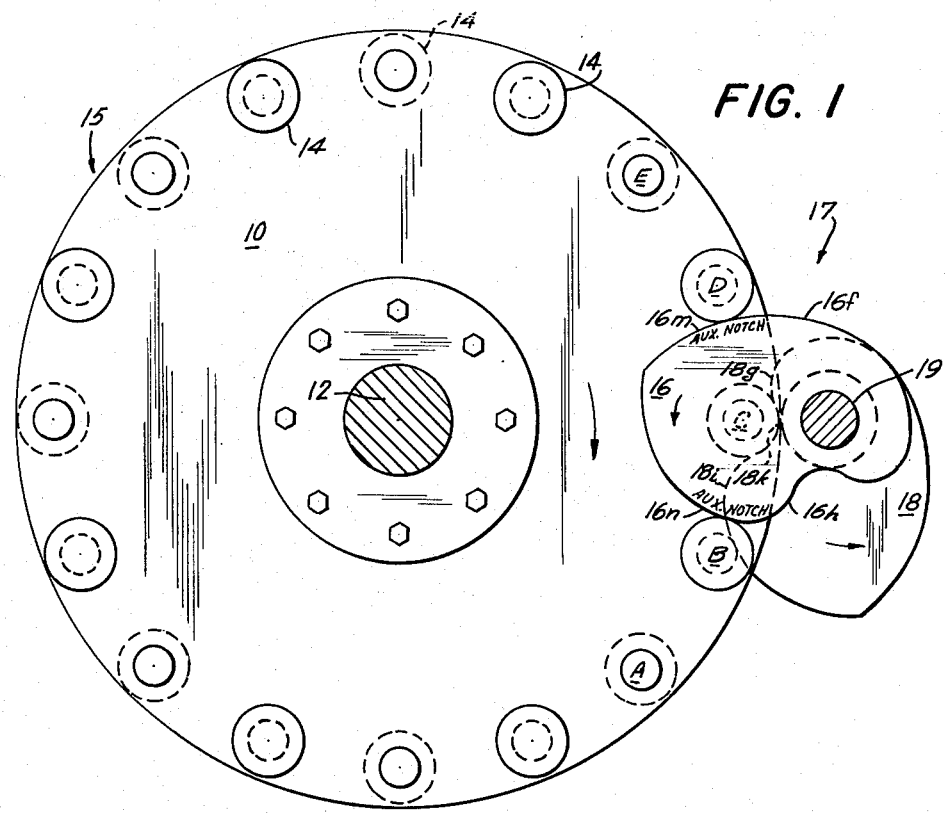
FIGURE 1 is a plan view of an eight station, dual cam device, a preferred embodiment of our invention.
Figure 2:
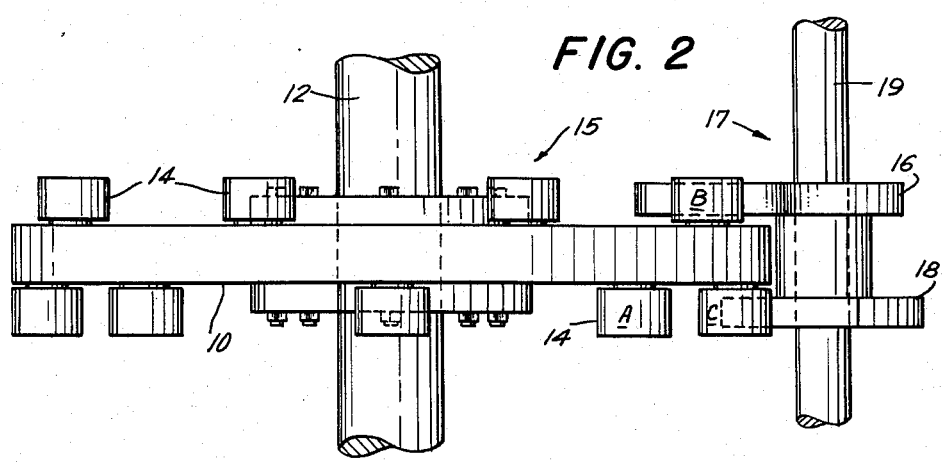
FIGURE 2 is a view of the same in side elevation.

The following description will mainly be in terms of indexing mechanisms, but should also be understood to be applicable to intermittent rotary power transmissions in general.

Referring first to FIGURES 1 to 5, the embodiment there shown includes a rotatable indexing wheel 10 (referred to more broadly as a rotor) perpendicularly mounted on a driven shaft 12 and shown here as a "pin wheel gear" having cam rollers 14 equispaced alternately on opposite sides of this wheel at a constant radial distance from the driven shaft 12. This pin wheel gear 15 is driven by a cam drive 17 comprising two rotary cams 16 and 18 both mounted parallel to the indexing wheel 10 on a common perpendicular drive shaft 19. These two cam plates 16 and 18 are spaced from one another so that each shares a plane in common with the upper and the lower extending cam rollers 14, respectively.

The cam drive 17, in each illustrated embodiment, basically has:

(1) a set of two equiangular dwell segments 16a and 18b (e.g. 82° in FIGURE 3), each of constant radius, for locking the pin wheel 15 in a precise position, without rotation, by bearing respectively on opposing faces of an adjacent pair of the rollers, e.g. 14A and 14B, during the rotation of the cam drive 17 through the dwell angle, (2) an acceleration segment 18c of increasing radii for bearing on the leading roller 14A (see FIGURE 4) to accelerate smoothly the pin wheel 15, and in order to lock (i.e., to maintain positive engagement of) this roller 14A on this acceleration segment 18c an acceleration-lock segment 16d of correspondingly (i.e., simultaneously) decreasing radii is provided for bearing back on the trailing roller 14B. The locking action occurs by reason of these segment surfaces simultaneously engaging opposing faces of the respective rollers 14A and 14B during the acceleration, (3) a notch segment 16e, into which the trailing roller 14B is driven by the acceleration segment 18c (acting on 14B through the wheel 10), positively engages this trailing roller 14B (just prior to the position shown in FIGURE 5) to drive the wheel 10 about its axis. This positive engagement of the roller 14B by the notch segment 16e permits the disengagement of the leading roller 14A as it passes on with further rotation of wheel 10, (4) a deceleration segment 16f of decreasing radii for bearing back on the next trailing roller, e.g. 14D, to decelerate smoothly the pin wheel 15 (see FIGURE 1), and in order to lock (i.e. maintain positive engagement of) this roller 14D on this deceleration segment 16f, a deceleration-lock segment 18g of correspondingly (i.e. simultaneously) increasing radii is provided for bearing forward on an originally trailing roller 14C (which now becomes the leading roller).

These basic elements may be embodied in one cam or may be divided between two or even more, and may be added to or repeated, thus increasing the versatility of these indexing mechanisms. For example, my first embodiment has all these basic segment contours divided between two cams, while in my third embodiment they all occur on one cam and are repeated three times. This division in my first embodiment enables the use of larger cam plates with correspondingly increased control, because the immediately adjacent rollers, being on the other side of the indexing wheel 10, therefore do not strictly limit the cam plate size.

The drawings illustrate the sequence of operation of my invention. In FIGURE 3 the cam drive 17 is just about to enter the dwell period (which for this first embodiment is 82°). The upper dwell segment is shown about to bear on roller 14B with the lower dwell segment approaching roller 14A.

Note that, with the regularity of the pin wheel 15 and with the two dwell segments having equal radii, the upper and lower cam plates are congruent, as can be seen by rotating one 180° with respect to the other about the "rotational symmetry" line indicated in FIGURE 3. This congruency naturally results in a considerable saving in their manufacture according to this invention, since these cams can be produced as duplicates.

FIGURE 4 shows the cam drive 17 near the end of the dwell period after rotating counterclockwise 90° from the position shown in FIGURE 3. Roller 14A is about to roll along the acceleration-lock segment of upper cam 16.

FIGURE 5, 90° further, shows roller 14B in driving engagement with cam 16 having just left the notch in the upper cam 16. Another 90° of rotation will then seat roller 14C into a second notch, occurring in the lower cam 18, see FIGURE 1.

Figure 14:
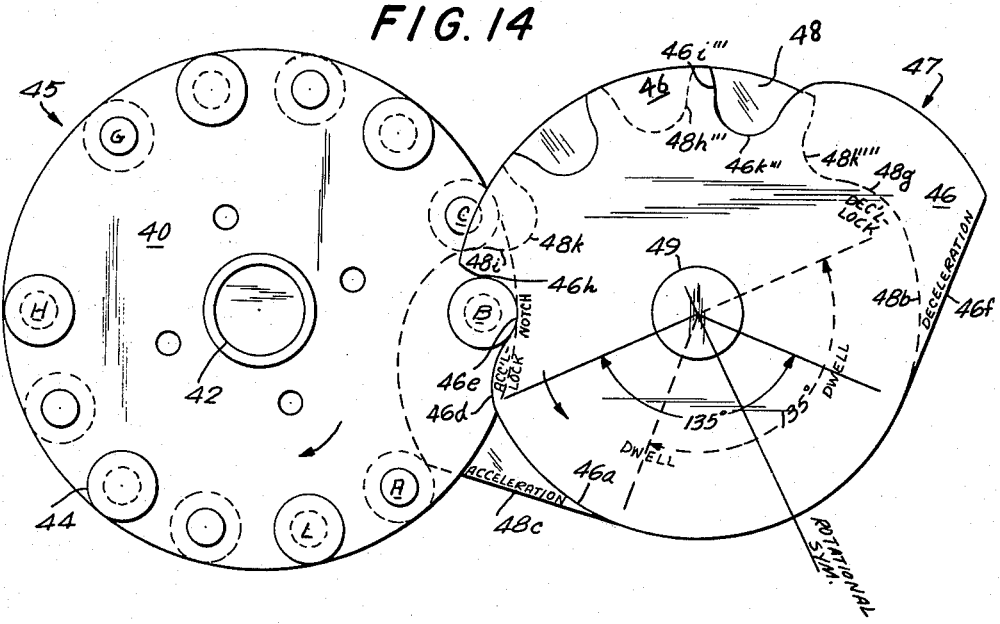
FIGURE 14 is a plan view similar to FIGURE 1 but of a fourth embodiment, a two station, dual cam indexing mechanism embodying the present invention with the dwell angle for each cam plate indicated.

Because of the second notch, this first embodiment has three segments in addition to the basic ones mentioned above, which may appropriately be called a constant-drive segment 16h, a constant-drive-lock segment 18i, and another notch segment 18k (see FIGURE 1 and 5). Looking at FIGURE 5, the overlapping outlines of these two segments of cam plates 16 and 18 form the outline of an epicycloidal gear tooth, see G in FIGURE 3, (or rather a similar tooth form, being an epicycloid cut down by one-half the width of rollers 14). This is to be expected, since it has been mathematically demonstrated that a pin wheel (whose pins have only one dimension, i.e. no width) drives, or is driven by, a gear having epicycloidal teeth at a constant rotational velocity. When the pins (in this case rollers) are three-dimensional, the teeth must be trimmed down from true epicycloids. This use of reduced epicycloidal teeth is even more clearly demonstrated in the fourth embodiment, shown in FIGURE 14, where each of the cam plates 46 and 48 has two and one-half such reduced epicycloidal teeth which in overlap, outline the equivalent of five such reduced epicycloidal teeth.

The shape of these "teeth," and their corresponding segments, may be varied, e.g. for variable speed, or increased torque, etc.

Finally, 90° beyond the position shown in FIGURE 5, cam drive 17 leaves the notched position illustrated in FIGURE 1 and rotates the pin wheel 15, engaged between the appropriate deceleration segments, back to the dwell position (just a little more than 360° beyond FIGURE 3).

Thus, in this first embodiment, one complete rotation of cam drive 17 completes a one station index past two rollers in an eight station indexing mechanism. Also, throughout the indexing, the cams 16 and 18 were continually in positive engagement between at least two rollers 14.

Note, that if one looks more closely at FIGURES 1 to 5, one can see that sometimes three rollers are engaged at one time thereby doubly ensuring positive engagement, particularly during actual rotation of the pin wheel 15. Thus, it is even possible for the duplicating segment to become a part of the basic segment by replacing at least a portion of the corresponding primary segment, if desired.

For example, notch segment 18k (see FIGURE 1) may be reduced to being merely that portion of cam 18's curve where the decreasing radii start to increase, or even be replaced altogether, with its positive engagement and driving functions taken over by what might be called "auxiliary notch" segments 16m and 16n. This could similarly happen to notch segment 16e.

Figure 6:
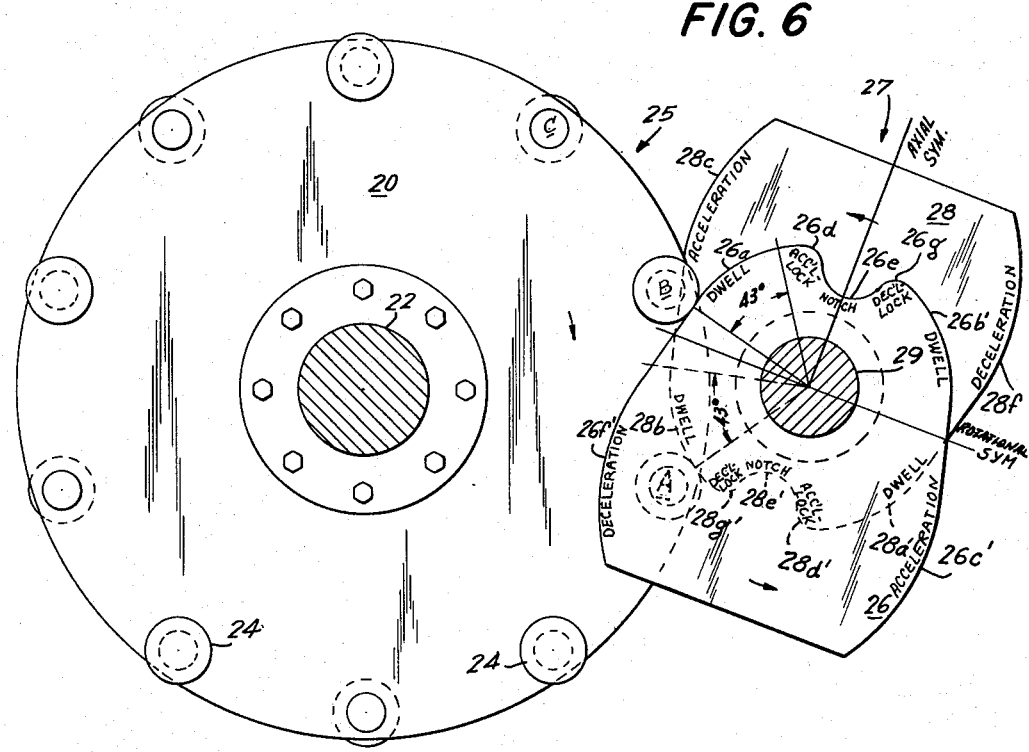
FIGURE 6 is a plan view similar to FIGURE 1 but of another embodiment, a ten station, dual cam indexing mechanism embodying the present invention, with one of the dwell angles indicated for each cam.
Figure 7:
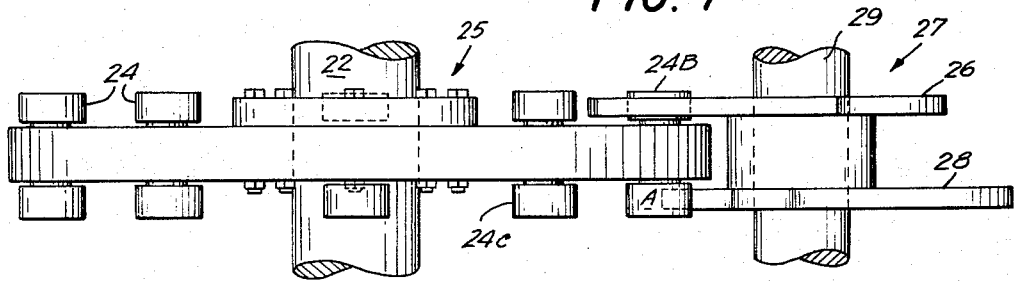
FIGURE 7 is a view of this second embodiment in side elevation.
Figure 8:
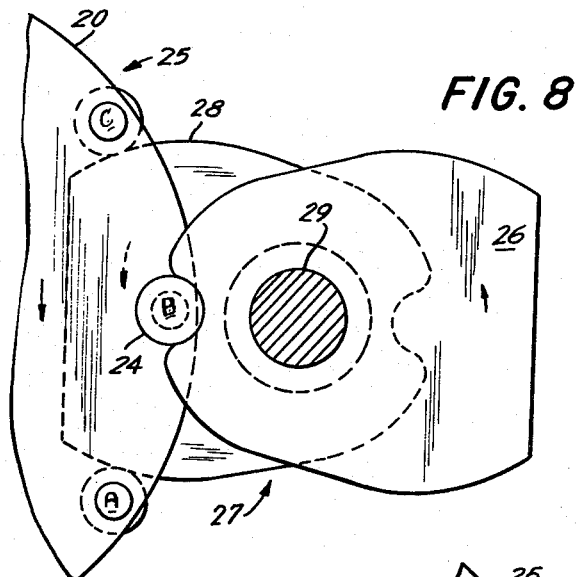
FIGURE 8 is a fragmentary plan view of this second embodiment after about a 110° counterclockwise rotation from FIGURE 6.
Figure 9:
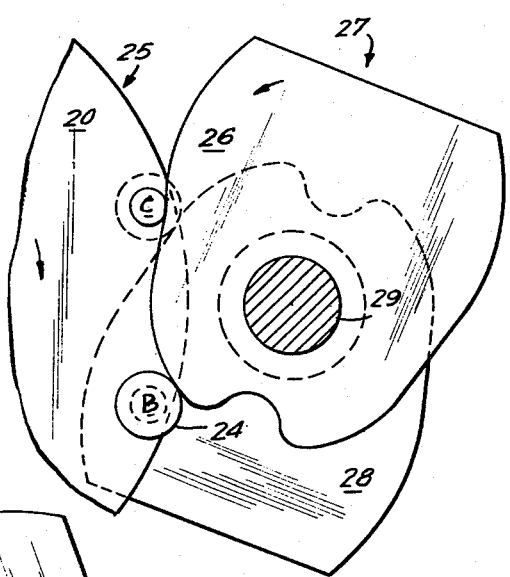
FIGURE 9 is a view similar to FIGURE 8 after a rotation of 180° from FIGURE 6.
Figure 10:
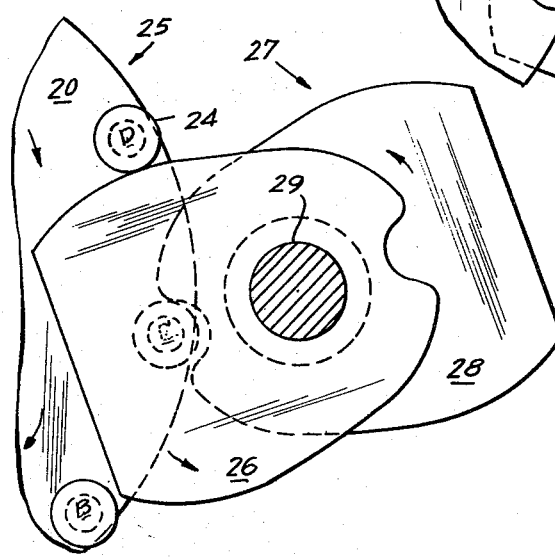
FIGURE 10 is a view similar to FIGURE 8 after a rotation of about 310° from FIGURE 6.

The second preferred embodiment illustrated in FIGURES 6 to 10 has all the basic segments referred to above, divided between two cams 26 and 28 and has all these basic segments repeated once (i.e. one will find this embodiment has two sets of basic segments, with the second set indicated by (') primes, see FIGURE 6). Thus, this second embodiment, a ten station indexing mechanism, completes an index of one station after only one-half a complete rotation of cam drive 27 and past only one roller 24 (e.g. from FIGURE 6 to FIGURE 9), because the second notch is part of a second set of segments and not part of the constant-velocity-epicycloidal teeth as found in my first and fourth embodiments.

The third preferred embodiment illustrated in FIGURES 11 to 13 also has all the basic segments referred to above, all on one cam plate 36, but repeated three times (see FIGURE 11 where the second and third set of segments are set off by single and double primes). Consequently, this eight station embodiment completes an index of one station after only a third of a complete rotation of cam drive 37 and past only one roller 34. This embodiment illustrates that the radii of one of the dwell segments do not have to equal those of the other. By analogy, this also holds true where dual cam plates are used. However, in one further respect this embodiment does differ from the others illustrated. Namely, when the acceleration segment of increasing radii cams against roller 34A, said segment thereby drives roller 34B into the trailing notch; and, while roller 34B is in the notch, cam plate 36 is not bearing on any other roller. However, pin wheel 35 is still positively engaged, because cam plate 36 has taken the alternative of engaging a roller at at least two points on opposite sides of the roller's axis, rather than, as formerly, by engaging at least two rollers at single points on opposite sides of their respective axes. This feature could, of course, be incorporated into the other embodiments if desired.

Figure 15:
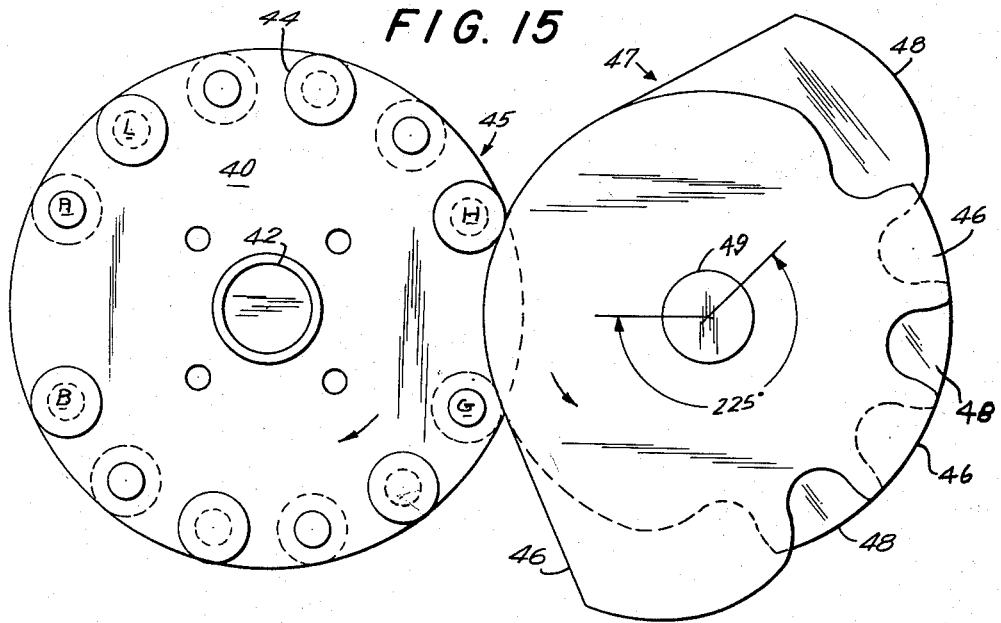
FIGURE 15 is a plan view of a portion of this fourth embodiment after about a 225° counterclockwise rotation from FIGURE 14.

The fourth preferred embodiment illustrated in FIGURES 14 and 15 again has all the basic segments referred to above, divided between two cam plates 46 and 48. This embodiment differs from the other three mainly in that the equispacing of rollers 44 of the pin wheel 45 is discontinued at two equal spaces 180° opposite each other. If the spacing at these two points (i.e. between the dwell rollers A and B and G and H) curve the same as between the other rollers, then because of the size of the drive cam 47 relative to the spacing between the other rollers, the drive cam 47 would have been only shallowly locked during the dwell period and damage might have resulted to the rollers due to the high mechanical advantage on the rollers resulting from such a very shallow lock. The other major difference from the other illustrated embodiments is the presence and number of reduced epicycloidal tooth outlines (mentioned earlier when discussing the first embodiment). (See FIGURE 14, where the tooth segments, h, i, and k, are differentiated by (') primes.) As a consequence, this fourth embodiment is only a two station indexing mechanism (i.e., rotates the pin wheel 45, 180° with each indexing) and indexes past six rollers, or in other words completes one index with every complete 360° rotation of the cam drive 47. This latter embodiment is specifically employed in the apparatus illustrated in the copending application by my co-worker, John L. Rudlaff, and myself, Serial No. 277,272, filed May 1, 1963.

One of the great advantages of this invention is its ability to be adapted readily to the many diverse indexing requirements encountered daily in industry. For example, one may provide for different numbers of equispaced stations. In addition, it is within the scope of this invention to vary the angular and radial spacing of the cam rollers and correspondingly the shape of the cam drive (while retaining the basic segments), thereby varying the spacing between successive indexing stations of a given indexing mechanism. The dwell period can be tailored to the job requirements; and even extended, where the engaged dwell angle ranges advantageously from 10° to 180°, by disengaging or shutting off the motor (i.e. when there is practically no load on it). Similarly, the rates of acceleration and deceleration can be varied together, and even with respect to each other. It has the capacity to operate over a wide range of indexing speeds limited only by the requisites of indexing. It is an advantage of this invention that the pin wheel is precisely positioned during the dwell period even though the motor is not shut off at precisely the same point every time in the indexing cycle.

These indexing mechanisms can also be rotated either forward or backward, and with substantially the same efficiency in either direction if the cam drive is symmetrical. These devices can be adapted to operate with torque loads from high to low values. If the distance from the center of the indexing wheel to the centers of the cam rollers is called R (i.e. the radius of the circle of centers of the cam rollers) and if the minimum distance from the center of the cam drive to the same circle of centers is called A, then the ratio $A/R$ would normally range from 1/5 to 1/1 in order to generate the torque values found to be generally most desirable. Thus, by varying the strength of the components and their relative sizes, large to small torques can be accommodated.

It has also been determined that the ratio of $r_1$ (the minimum distance from the center of the cam drive to the periphery of a cam roller) to the $\rho$ (rho, the radius of curvature of the cam at the point of intersection between the cam and its roller) should normally range from 1½/1 to 4/1. Note that $\rho$ must be greater than $r_1$ for any indexing to take place, and further that the rate of change in $\rho$ is closely related to acceleration or deceleration of the pin wheel.

In the preferred embodiments the "pins," or cam bearing means, of the pin wheel have been illustrated and described as "cam rollers." In view of the high torque loads and the sliding cam action which may be required, it has been determined that rollers made of tough hardened steel fitted with low friction bearings on bolts sturdily anchored to the indexing wheel are the most desirable type of "pin" for use in this invention. Nevertheless, it is within the scope of this invention to use any type of "pin" or cam bearing means with an abutment having a face adapted to make sliding or rolling engagement with the cams. Preferably such "pin" is at least arcuate-faced so as to keep the location of the bearing contact as nearly predetermined as possible with respect to the axis of the "pin." For example, for quiet self-lubricating action, nylon (or other polymeric) sleeves on steel pins or solid nylon blocks or studs may be found desirable. Also, if desired, "pins" can occur in more than the one or two planes illustrated, with correspondingly more cam plates.

The actual shape of the plates of a given cam drive is determined in part by spatial limitations (for example, the number of stations and their spacing), in part by the dwell required at the operating stations, in part by the rate of acceleration which can be tolerated, the average torque desired, the method of ensuring positive cam engagement, and the size and placement of the cam rollers; all have a part in determining the final result. Modification of the disclosed preferred embodiments by varying the various parameters just listed (which list is intended to be exemplary and not exhaustive) can be readily done by anyone skilled in the art to produce an indexing mechanism, or other intermittent rotary power transmission, for a given situation.

I claim:

1. A rotary indexing device comprising a driven rotor having a plurality of cam bearing means fixed at a constant distance from the rotor's axis, each angularly equispaced one from its neighbor, and grouped together at less than 180° about the rotor's axis and having an equal number of similarly disposed cam bearing means grouped together in the other 180°, said groups being equally spaced from each other, all of said cam bearing means being alternately fixed on opposite sides of a plane perpendicular to the axis of said rotor, a cam drive having two rotary cams, each of which includes a plane passing through its cam surfaces and those of its respective set of alternate cam bearing means and each cam is rotatable on a common axis perpendicular to said plane, said cam drive and said rotor being mounted with their axes parallel with one another and spaced at a fixed distance to give a predetermined torque, said cams being shaped each to include an equiangular dwell segment of constant radii long enough simultaneously to bear between said groups respectively in opposing directions on one of the two pairs of adjacent alternate group-end-position cam bearing means, said groups being sufficiently widely spaced to ensure positive engagement of said rotor by said dwell segments whereby the rotor is held from moving during the rotation of said cam drive in the dwell angle, one of said cams further being shaped with an acceleration segment of increasing radii for bearing on the leading cam bearing means as the dwell segments leave this respective pair of cam bearing means to accelerate smoothly the rotor at predetermined rates, and the second cam being further shaped with an acceleration-lock segment of correspondingly decreasing radii for bearing back on the trailing cam bearing means sufficiently to ensure positive engagement of said pair of group-end-position cam bearing means on these acceleration cam surfaces during the acceleration period, said second cam still further being shaped with a first notch segment to engage positively the trailing cam bearing means as it passes between the axis of the cam drive and the axis of the driven rotor thereby permitting the drive cam thereafter to disengage the leading cam bearing means, said cams additionally being shaped with at least one constant velocity set of segments which set includes:

(i) a constant-drive segment of increasing radii to bear on the former trailing, now leading, cam bearing means and (ii) a constant-drive-lock segment of correspondingly decreasing radii to encounter and to bear back on the next trailing cam bearing means, which two segments respectively engage the newly adjacent pair of cam-bearing means in a positive manner to impart a constant angle of velocity to said driven rotor, and (iii) another notch segment to receive the newly trailing cam bearing means from the constant-drive-lock segment and to engage it positively as it passes between the axis of the cam drive and the axis of the driven rotor thereby permitting the drive cam thereafter to disengage the newly leading cam bearing means, the number of said constant velocity segment sets being equal to one less than the number of cam bearing means in one of the driven rotor's groups, these cams finally being shaped with a deceleration segment of decreasing radii for encountering and bearing back on the next trailing cam bearing means, which together with the former trailing, and now leading, cam bearing means forms a newly adjacent pair, whereby smoothly to decelerate said rotor and a deceleration-lock segment of correspondingly increasing radii to receive the newly-leading cam bearing means from the last notch segment and to bear forward on this newly-leading cam bearing means sufficiently to ensure positive engagement of the new pair on these deceleration cam surfaces during the deceleration period to the beginning of the next dwell period.

2. An intermittent rotary transmission device comprising a driven rotor having at least three cam bearing means spaced about the axis of said rotor at substantially less than 180° from each other, a cam drive which includes a plane passing through its cam surfaces and those of the cam bearing means and whose axis of rotation is perpendicular to said plane and is parallel to the perpendicular axis of rotation of said driven rotor, these axes being mounted spaced at a fixed distance to give a predetermined torque, said drive cam further comprising at least one set of cam segments including:

(a) two equiangular dwell segments each having a constant radius long enough to bear respectively in opposing directions on an adjacent pair of said cam bearing means, thereby to hold said rotatable plate, by positive engagement, from moving during the rotation of said cam drive through the dwell angle, (b) an acceleration segment of increasing radii for bearing on the leading cam bearing means as the dwell segments leave these respective cam bearing means to accelerate smoothly the rotor at predetermined rates, and an acceleration-lock segment of correspondingly decreasing radii for bearing back on the trailing cam bearing means sufficiently to ensure positive engagement of said pair of cam bearing means on these acceleration cam surfaces during the acceleration period, (c) a notch segment to engage positively the trailing cam bearing means as it passes between the axis of the cam drive and the axis of the driven rotor thereby permitting the drive cam thereafter to disengage the leading cam bearing means, (d) a deceleration segment of decreasing radii for encountering and bearing back on the next trailing cam bearing means, which together with the former trailing, and now leading, cam bearing means forms a newly adjacent pair, whereby smoothly to decelerate said rotor, and a deceleration-lock segment of correspondingly increasing radii to receive the newly-leading cam bearing means from said notch segment and to bear forward on this newly-leading cam bearing means sufficiently to ensure positive engagement of the new pair on these deceleration cam surfaces during the deceleration period to the beginning of the next dwell period.

References Cited in the file of this patent

UNITED STATES PATENTS 2,986,949    Lancaster et al. _____ June 1961